United States Patent [19]

Weyand

[11] Patent Number: 5,577,183
[45] Date of Patent: Nov. 19, 1996

[54] PRINTER SYSTEM THAT STORES COMPRESSED FONT GLYPHS IN DATA BLOCKS AND DECOMPRESSED GLYPHS IN EACH DATA BLOCK TOGETHER USING SAME DECOMPRESSION PROCEDURE

[75] Inventor: Chris Weyand, Boise, Id.

[73] Assignee: Hewlett-Packard Company, Palo Alto, Calif.

[21] Appl. No.: 565,934

[22] Filed: Dec. 1, 1995

Related U.S. Application Data

[63] Continuation of Ser. No. 210,210, Mar. 18, 1994.

[51] Int. Cl.⁶ ................................................ G06K 15/00
[52] U.S. Cl. ........................... 395/114; 395/115; 395/167
[58] Field of Search ................................ 395/110, 114, 395/115, 150; 382/56, 30, 27, 28; 345/189, 190, 192, 193, 194, 195, 202, 27, 28

[56] References Cited

U.S. PATENT DOCUMENTS

| | | | |
|---|---|---|---|
| 4,481,602 | 11/1984 | Bohrer et al. | 364/600 |
| 4,942,390 | 7/1990 | Do et al. | 395/114 |
| 5,020,121 | 5/1991 | Rosenberg | 382/56 |
| 5,025,396 | 6/1991 | Parks et al. | 395/147 |
| 5,065,447 | 11/1991 | Barnsley et al. | 382/56 |
| 5,123,061 | 6/1992 | Pritchard | 382/56 |
| 5,151,949 | 9/1992 | Miyata | 382/9 |
| 5,272,768 | 12/1993 | Bauman et al. | 395/110 |
| 5,303,313 | 4/1994 | Mark et al. | 382/56 |
| 5,347,266 | 9/1994 | Bauman et al. | 345/143 |
| 5,347,600 | 9/1994 | Barnsley et al. | 382/56 |
| 5,367,620 | 11/1994 | Ito et al. | 395/150 |
| 5,416,898 | 5/1995 | Opstad et al. | 395/150 |
| 5,479,587 | 12/1995 | Campbell et al. | 395/116 |

FOREIGN PATENT DOCUMENTS 0585522  3/1994  European Pat. Off. .

*Primary Examiner*—Heather R. Herndon
*Assistant Examiner*—Stephen Hong

[57] ABSTRACT

Data processing apparatus provides pixel data representations of font glyphs, and includes a memory which stores font data in plural groups of entries. A first group of entries comprises a series of data blocks, each data block including data-compressed forms of plural glyphs. The plural glyphs in a data block exhibit a common attribute which suggests that the plural glyphs be decompressed together. A processor is responsive to a signal stream that includes character codes, to access from the memory a data block that includes a glyph corresponding to a received character code. The processor subjects all data compressed forms of glyphs from the data block to one of a plurality of decompression procedures. In this manner, all decompressed pixel data representations of glyphs in a data block become available for use by the processor as a result of the decompression action. Under certain circumstances, decompressed glyph font data is cached for subsequent use, after decompression.

9 Claims, 2 Drawing Sheets

PRINTER SYSTEM THAT STORES COMPRESSED FONT GLYPHS IN DATA BLOCKS AND DECOMPRESSED GLYPHS IN EACH DATA BLOCK TOGETHER USING SAME DECOMPRESSION PROCEDURE

This is a continuation of copending application Ser. No. 08/210,210 filed on Mar. 18, 1994.

FIELD OF THE INVENTION

This invention relates to data processing systems that employ outline font representations and, more particularly, to a printer system that includes compressed fonts and procedures for decompression thereof which reduce font storage capacity requirements.

BACKGROUND OF THE INVENTION

Many fonts are stored in outline form and, when accessed by a printer, are "filled in" so as to evidence complete stroke representations of font characters. TrueType is an industry standard which defines the representation of certain computer outline font data. When the TrueType format is employed to represent large fonts (e.g. Kanji), memory requirements may exceed 2–5 megabytes. As such fonts are often stored in read only memory (ROM), large and expansive ROMs are required. A font may also be stored on a disk drive (e.g. in a computer operating system), or in random access memory (RAM) (e.g. fonts kept in a computer's main memory).

While reduction of font storage memory requirements is an ever-present objective, there is a parallel need to maintain compatibility with previously defined industry font standards (e.g. TrueType). In FIG. 1, a data processing system (e.g. a laser printer) is shown which is adapted to utilize TrueType outline font data. System 10 includes a microprocessor 12 that is connected via a bus system 14 to a laser print engine 16. Bus system 14 also connects to a ROM 18 that includes a TrueType font table 19 (to be discussed below with respect to FIG. 2). A random access memory (RAM) 20 is also connected to bus system 14, as is a print buffer 22. It is to be understood that print buffer 22 may be a portion of RAM 20.

An input/output module 24 is adapted to receive a message stream from a host computer that includes character codes. Each character code specifies a glyph which is the data that represents a character or a portion of a character and, when configured in pixel data form, can be stored in print buffer 22. In the case where a character comprises plural glyphs, one glyph will specify additional glyphs from which the complete character is built. Such pixel data, when provided to print engine 16, enables the deposition of ink on a media sheet that reproduces the glyph or glyphs.

When system 10 receives a message stream from a host computer that includes both character codes and print commands, the character codes are temporarily stored and are then converted to glyph data by reference to font table 19. The glyph data is stored in pixel form in print buffer 22 and is then provided to print engine 16.

FIG. 2 shows a TrueType font table 19, as it is stored in ROM 18 in FIG. 1. TrueType font table 19 comprises several subtables that are defined in the document TrueType Font Files Version 1.00, Microsoft Corporation, Redmond, Wash. TrueType font table 19 commences with a header 30 and a tag line 32 that forms an entry in directory portion 34. Tag line 32 includes a tag (i.e., a "name") identifying the table, a checksum for error correction purposes, a length field which defines the length of the table, and an offset value indicating the point at which the table begins after a directory portion 34.

Each TrueType font table 19 includes a number of tables, of which three subtables are a CMAP table 36, a LOCA table 38 and a GLYPH table 40. CMAP table 36 is addressed in accordance with a received character code and returns an associated glyph index value. Each glyph index value serves as an address into LOCA table 38 and is associated with an offset value. In response to a received glyph index value, LOCA table 38 returns an offset value which identifies the address offset within glyph table 40 wherein there is found pixel-data form of a glyph identified by the received character code. Glyph table 40, in a standard TrueType font table, occupies approximately 90 percent of ROM 18 and, as above indicated, may be as large as 2–5 megabytes.

Once a glyph has been accessed from glyph table 40, it is processed, using a "fill" procedure 42 stored in RAM 20 in FIG. 1. Fill procedure 42 enables the outline glyph data to be completely "filled in" so that the pixel data in print buffer 22 represents a fully filled-in character. At this stage, a glyph in print buffer 22 is ready for printing by print engine 16. If the glyph data from glyph table 40 includes only a portion of a character, a further procedure is employed to associate the glyphs to arrive at a complete character.

It is therefore an object of this invention to provide a data processing system which minimizes font storage requirements by storing the font data in a compressed form.

It is another object of this invention to provide a data processing system with compressed format font storage that is compatible with pre-existing font standards.

It is yet another object of this invention to provide a data processing system with compressed font storage and to further provide decompression procedures that enable a most efficient decompression action to be carried out with respect to individual stored glyphs.

SUMMARY OF THE INVENTION

Data processing apparatus provides pixel data representations of font glyphs, and includes a memory which stores font data in plural groups of entries. A first group of entries comprises a series of data blocks, each data block including data-compressed forms of plural glyphs. The plural glyphs in a data block exhibit a common attribute which suggests that the plural glyphs be decompressed together. A processor is responsive to a signal stream that includes character codes, to access from the memory a data block that includes a glyph corresponding to a received character code. The processor subjects all data compressed forms of glyphs from the data block to one of a plurality of decompression procedures. In this manner, all decompressed pixel data representations of glyphs in a data block become available for use by the processor as a result of the decompression action. Under certain circumstances, decompressed glyph font data is cached for subsequent use, after decompression.

DETAILED DESCRIPTION OF THE INVENTION

Figure 1:
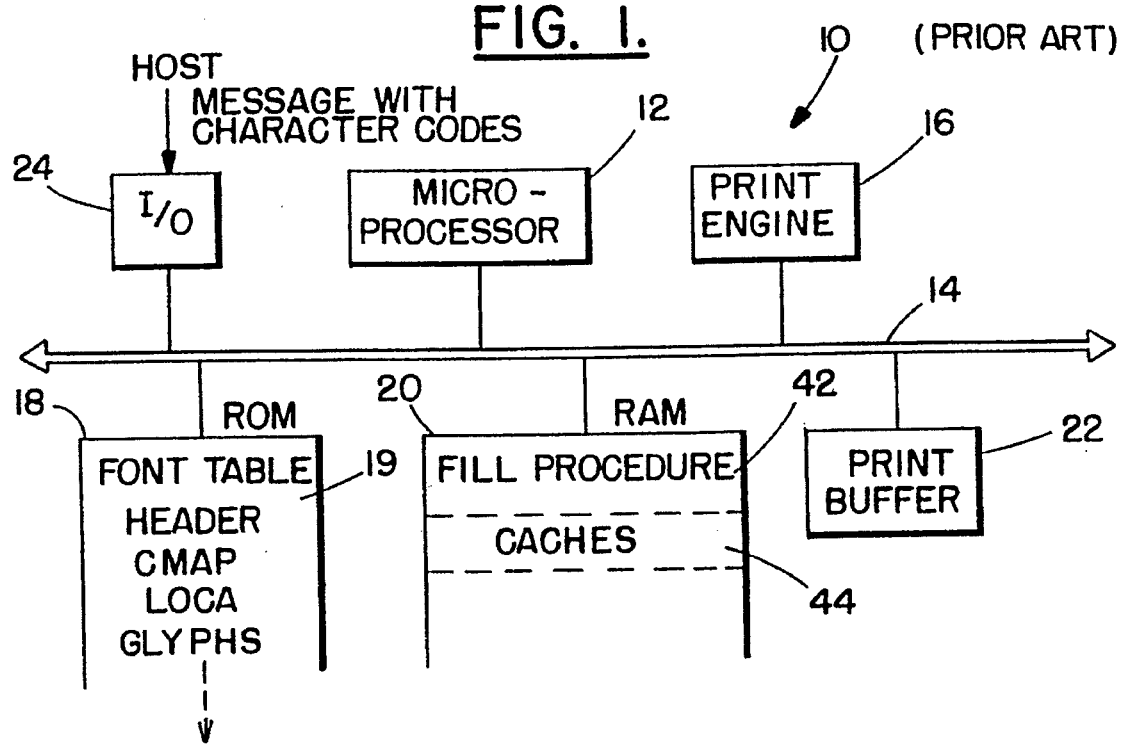
FIG. 1 is a block diagram of a prior art data processing system which includes a memory for storage of outline font data.

Prior to describing details of the invention, it is well to understand that the system shown in FIG. 1 is capable of performing the invention, so long as it stores in memory the requisite revised font table and compressed glyph blocks to be described below. While system 10 is shown as a printer, it is to be understood by those skilled in the art that the invention may be configured for use by a host processor, a printer including a microprocessor, or a combination of the two. In any case, the inclusion of data structures shown in FIGS. 3 and 4 in combination with a procedure enabling use of such data structures, allows for substantial font memory conservation.

Figure 2:
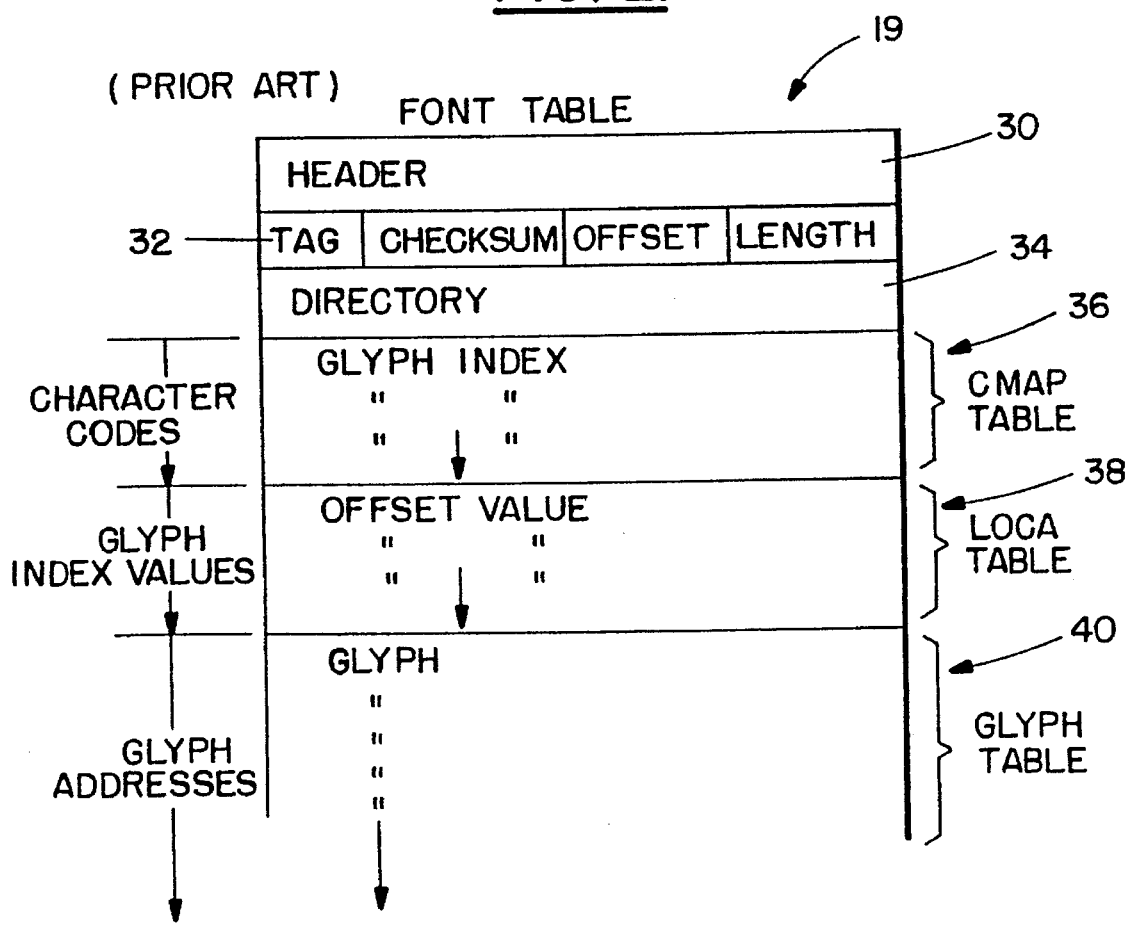
FIG. 2 is a schematic representation of a TrueType font table data structure, as specified by a prior art industry standard.
Figure 3:
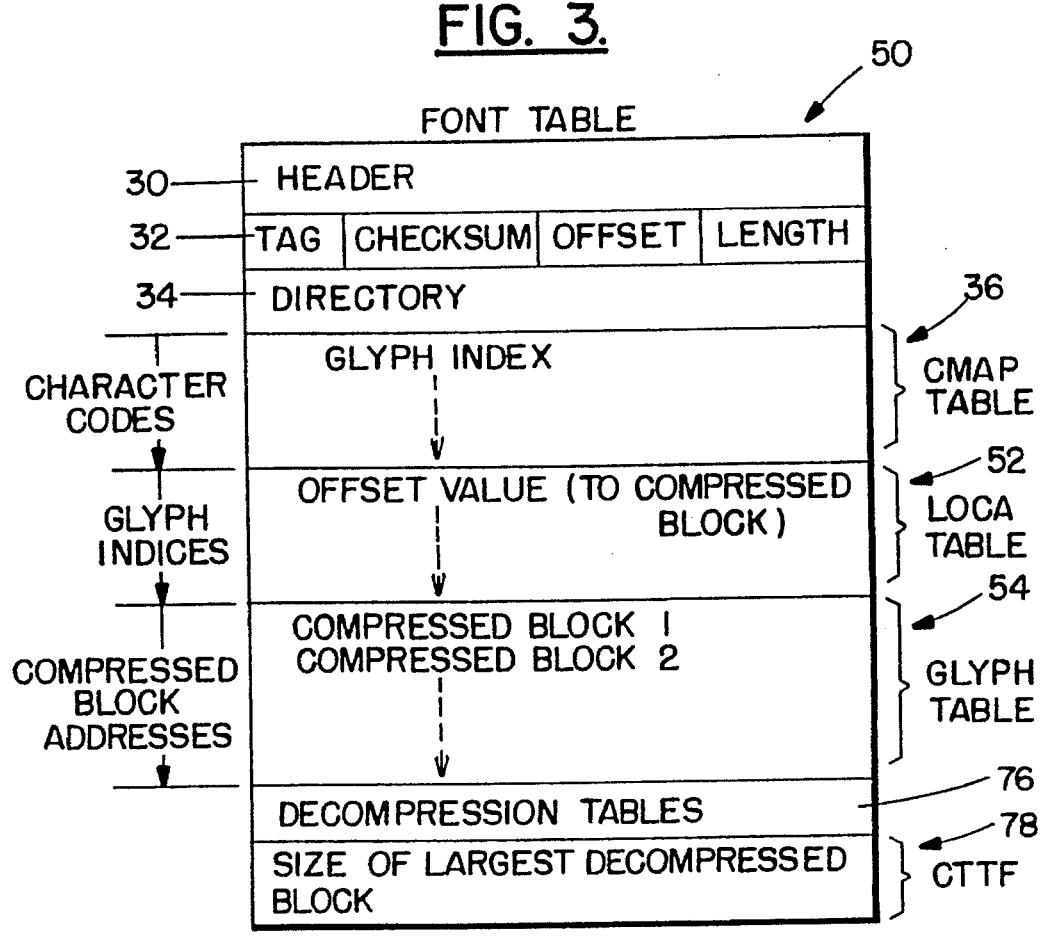
FIG. 3 is a schematic illustration of a ROM font table that in the operation of the invention.

Turning to FIG. 3, font table 50 resembles the prior art TrueType font table 19 shown in FIG. 2, but has been revised so as to enable inclusion of compressed glyph data. Header portion 30 and directory 34 (including tag line 32) are substantially identical to that shown in FIG. 2. The length and offset values in tag line 32 are altered in accordance with the reduced size font table. CMAP table 36 is also substantially identical to that shown in FIG. 2 and converts received character codes to glyph index values. Each glyph index value accessed from CMAP table 36 enables the addressing of an associated offset value in LOCA table 52. In this case, however, the offset value returned by LOCA table 52 in response to a glyph index address, points to an initial address of an offset list portion of a compressed glyph block that is stored in glyph table 54. It is to be understood that the vacuum tables and subtables shown in FIG. 3 are not necessarily contiguously stored. They are accessed using offset data from directory 34.

Before proceeding to further describe font table 50, an exemplary compressed glyph block 60 will be described in relation to FIG. 4. Each compressed glyph block 60 contains a portion 62 that includes a plurality of compressed glyph data segments. While portion 62 of a compressed glyph block 60 may contain just one compressed glyph data segment, it is generally the case that plural compressed glyph data segments are contained in portion 62. All glyphs contained in portion 62 are compressed using the same compression procedure so that a single decompression procedure can be used to decompress the data back to its original pixel outline data state. All glyphs contained within portion 62 are characterized by a common use attribute which renders it logical to decompress all of the glyphs in portion 62 when any one glyph is requested. For instance, the compressed glyph data in portion 62 may comprise plural glyphs which must be combined to render a complete alphanumeric character. Further, the compressed glyph data in portion 62 may also be grouped on a frequency of use basis. Thus, a first compressed glyph block 60, will include most often used glyphs; a second compressed glyph block 60 will include less often used glyphs, etc.

Compressed glyph block 60 contains a further portion 64 which stores plural offset values 66, 68, 70, etc. Value 66 indicates the initial offset address of a pixel in a first glyph contained in compressed form in portion 62, after it has been decompressed and placed in memory. (The first decompressed glyph always has a 0 offset.) Thus, as shown at 72, a first decompressed glyph occupies addresses 0–110; a second decompressed glyph occupies addresses 111–250, a third occupies addresses 251–370, etc. The offset values contained in portion 64 thus enable microprocessor 12 to identify and locate each of the decompressed glyph pixel representations subsequent to decompression and placement in memory.

A compressed glyph block 60 (FIG. 4) contains a further section 74, termed an "Hidx" byte (where Hidx is an acronym for "Huff index"). Two bits of Hidx byte 74 are employed to identify a "caching" status of decompressed glyph pixel data from block 60 and four bits are employed to identify a decompression procedure that is to be utilized during the decompression of the compressed glyph data segments in compressed glyph block 60. Under certain circumstances, the glyph data segments will not be in a compressed state and this will be indicated by the aforesaid four bits exhibiting all zero states.

As above indicated, all compressed glyph data segments in portion 62 of a compressed glyph block 60 are decompressed employing the same decompression procedure. Thus, glyphs contained in portion 62 are preferably chosen to evidence a similar characteristic which enables them to be compressed using a common compression procedure. This enables compressed glyph data segments contained in portion 62 to be efficiently decompressed by a specially tailored decompression procedure.

Figure 4:
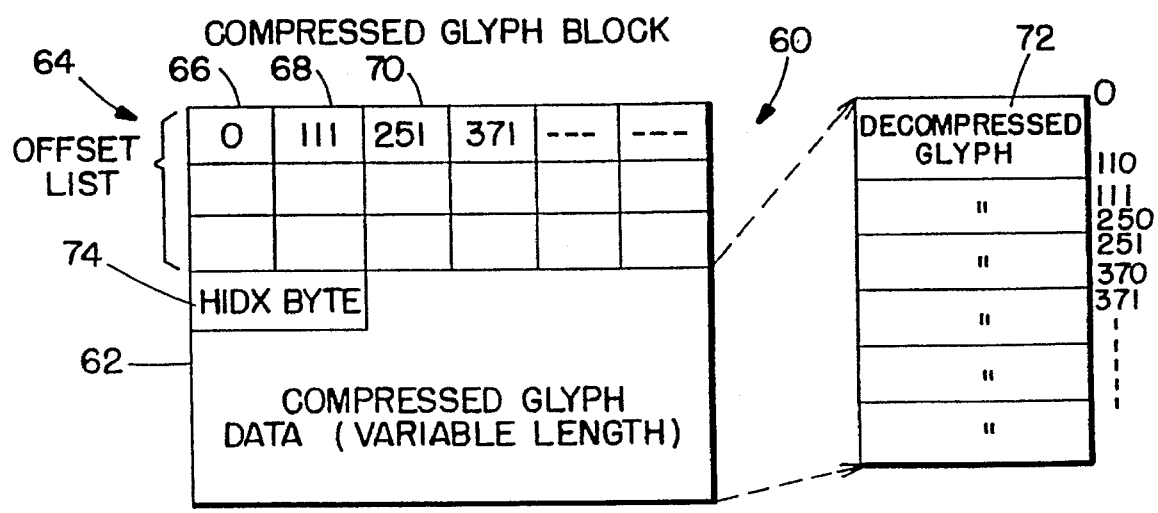
FIG. 4 is a schematic representation of a compressed glyph block data structure that is employed in the invention.

Data which guides a decompression routine to perform a tailored decompression procedure is stored in font table 50 in decompression table portion 76 (see FIG. 4). The four bits in Hidx byte 74 identify which data is to be used by a decompression procedure to decompress the compressed glyph data segment in portion 62 of compressed glyph block 60. For instance, each decompression procedure in portion 76 may include a subset of a Lempel-Ziv dictionary (a commonly used compression/decompression procedure) and will contain only dictionary entries that are particularly relevant to the particular glyphs contained in portion 62. In the alternative, portion 76 may only contain offset and length data that enables Lempel-Ziv data stored elsewhere to be accessed.

As above indicated, Hidx byte 74 includes two additional bits which identify the cache status for glyphs that are decompressed from portion 62. Three caching statuses are preferred—but others will be apparent to those skilled in the art. First, decompressed glyph data, may be discarded immediately after use (i.e., no caching). Second, the decompressed glyph data may be stored for a brief interval as it is known that if it is not used within the interval, that it is best to discard the decompressed glyph data. Third, the decompressed glyph data may be used sufficiently often that it is stored on a semi-permanent basis (or until the system is powered-down or otherwise instructed to discard the decompressed glyph data).

There is a tradeoff between the amount of compressed glyph data contained within portion 62 and the decompression time required to access such data and to decompress it. The larger the amount of compressed glyph data contained in portion 62, the more efficient the compression and the greater the memory savings. However, the more compressed glyph data that is contained in portion 62, the longer the time required for its decompression. Further, decompressed glyph data that has been previously cached, will offset some of the conflict. Nevertheless, one skilled in the art will realize that there is a tradeoff to be made in terms of processing time savings and memory—which tradeoff is decided by the user or the system designer.

Each portion 62 of a compressed glyph block 60 need not be the same length. For instance, those glyphs that are most commonly used may be contained in a smaller portion 62 so as to enable more rapid decompression and recapture. Less frequently used glyphs may be contained in larger portions 62 as they will be called upon less often and the added processing time will not be significant.

Returning to Font table 50 of FIG. 3, a final portion thereof is termed the "CTTF table" and its presence in a font table 50 indicates to the using system that glyph table 54 contains compressed glyph blocks 60. CTTF table 78 further contains a value indicating the amount of memory required for the largest decompressed glyph data from a portion 62 of a compressed glyph block 60. This enables the system to allocate sufficient memory in advance of decompression to accommodate all decompressed glyphs from a compressed glyph data portion 62 in a compressed glyph block 60. CTTF table 78 may also include individual values for each compressed glyph block 60, which indicates the amount of memory to be allocated for each block's decompressed glyph data portion 62.

The operation of the data processing system of FIG. 1 will now be described when ROM 18 contains the font table shown in FIGS. 3 and 4. Initially, system 10 receives a data stream which includes plural character codes from a host processor. A received character code is employed by microprocessor 12 to access a glyph index value in CMAP table 36. Those skilled in the art will realize that directory 34 is employed by microprocessor 12 to determine the initial address of CMAP table 36 (and other tables) so as to allow access thereto.

The glyph index that is returned from CMAP table 36 is then employed to access an offset value contained in LOCA table 52 which points into the offset list in a compressed glyph block. The returned offset value provides an address within glyph table 54 that indicates the initial bit position of a compressed glyph block 60 which contains a glyph that corresponds to the received character code.

Prior to accessing a compressed glyph block 60 from glyph table 54, however, the system checks to see if the desired glyph has already decompressed and is already cached in RAM 20 in cache area 44. If not, the compressed glyph block is accessed and stored in RAM 20.

The system reads the Hidx byte value and the CTTF table to determine the size of memory to be allocated for decompressed glyph pixel data and the particular decompression procedure to be accessed from portion 76. Once the decompression procedure is accessed, portion 62 of compressed glyph data segments is subjected to the decompression procedure and the decompressed glyphs are stored in RAM 20.

It will be recalled, that portion 64 of a compressed glyph block 60 contains a list of offset values for each of the glyphs in a compressed glyph block, after decompression. The system employs the offset values to enable access to a desired one of the decompressed glyphs. Once the selected decompressed glyph (or glyphs) are addressed and utilized, the system checks the cache status bits from the Hidx byte and either discards the decompressed glyphs, caches them in cache area 44 on a temporary basis, or on a semipermanent basis.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for providing pixel data representative of glyphs included in a font, said apparatus comprising:

memory means for storing font data and including plural groups of entries, a first group of entries comprising a series of data blocks, each data block including data-compressed forms of plural glyphs, plural glyphs from a data block exhibiting a common attribute such that each data-compressed form glyph is to be decompressed using a same decompression procedure, different data blocks exhibiting different common attributes, said memory means further including a second group of entries for enabling a character code to identify a data block containing a data-compressed form of a glyph and a third group of entries that enable an address to be identified of any data-decompressed form glyph from said data block; and processor means responsive to a signal stream including a character code, to use said second group of entries to access from said memory means a data block including a glyph corresponding to said character code, and for subjecting all data compressed form glyphs from said data block, including the glyphs which do not correspond to said character code, to said same decompression procedure so that all decompressed pixel data representations of said glyphs are available for use by said processor means, and using said third group of entries to identify a decompressed-data form glyph corresponding to said character code.

2. The apparatus as recited in claim 1, wherein said memory means stores plural decompression procedures and each data block includes an identifier indicating one of said decompression procedures to be employed with data-compressed form glyphs in said data block.

3. The apparatus as recited in claim 1 wherein said common attribute is further indicative that at least some glyphs in a data block are to be combined to create an alphanumeric character.

4. The apparatus as recited in claim 1 wherein said memory means includes a stored value indicating that said stored font data is in a compressed form.

5. The apparatus as recited in claim 4, wherein said entry is a value parameter that indicates a maximum amount of memory needed to accommodate a largest pixel data size for all decompressed glyphs from a data block.

6. The apparatus as recited in claim 5, wherein a presence of said value parameter in said memory means is said entry that indicates said stored font data is in a decompressed form.

7. The apparatus as recited in claim 1 wherein said memory means and processor means comprise portions of a printer.

8. The apparatus as recited in claim 1, further comprising cache means for storing decompressed pixel data from data blocks, each data block in said memory means including an indicator as to whether or not decompressed pixel data from a said block is to be stored in said cache means.

9. The apparatus as recited in claim 8 wherein said indicator further indicates a parameter for said decompressed pixel data which controls when said decompressed pixel data is to be removed from said cache means.

\* \* \* \* \*